(12) United States Patent
Schmitt et al.

(10) Patent No.: US 6,902,225 B2
(45) Date of Patent: Jun. 7, 2005

(54) WIND PROTECTOR FOR A CONVERTIBLE

(75) Inventors: Hans-Juergen Schmitt, Muehlacker (DE); Thomas Fischer, Sylvan Lake, MI (US); Gabor Herczeg, Leimen (DE)

(73) Assignee: Dr. Ing. h.c.F. Porsche Aktiengesellschaft, Stuttgart (DE)

( * ) Notice: Subject to any disclaimer, the term of this patent is extended or adjusted under 35 U.S.C. 154(b) by 0 days.

(21) Appl. No.: 10/802,031

(22) Filed: Mar. 17, 2004

(65) Prior Publication Data

US 2004/0245804 A1 Dec. 9, 2004

(30) Foreign Application Priority Data

Mar. 18, 2003 (DE) ......................................... 103 11 837

(51) Int. Cl.[7] .............................................. B62D 35/00
(52) U.S. Cl. ....................... 296/180.1; 296/85; 280/756
(58) Field of Search ............................... 296/180.1, 85; 280/756

(56) References Cited

U.S. PATENT DOCUMENTS 5,702,150 A * 12/1997 Reuter et al. ............ 296/180.1
5,899,521 A * 5/1999 Pfertner et al. .......... 296/180.1
6,557,928 B2 * 5/2003 Dreher et al. ............ 296/180.1

FOREIGN PATENT DOCUMENTS

| DE | 196 32 352 A1 | 8/1996 |
| DE | 100 35 995 A1 | 7/2000 |
| DE | 101 31 397 A1 | 8/2001 |
| EP | 1 067 001 A2 | 7/2000 |

* cited by examiner

Primary Examiner—Joseph D. Pape
(74) Attorney, Agent, or Firm—Crowell & Moring LLP

(57) ABSTRACT

A wind-deflecting device for a convertible includes a center part of the wind-deflecting device, which in its upright operating position is arranged between spaced-apart bar sections of a rollover bar and is held in place on the rollover bar via releasable locking connections. Each releasable locking connection includes a receiver fixed to the rollover bar and interlocking with a laterally supported holding element of the center part. The locking connection further has a pivotably supported spring-loaded notch lever to release the locking connection. To enable the releasable locking connection to be released from a sitting position and to increase ease of operation, the notch lever is arranged on the fixed receiver and a pushbutton interacting with the notch lever is provided on the receiver to pivot the notch lever.

10 Claims, 6 Drawing Sheets

WIND PROTECTOR FOR A CONVERTIBLE

BACKGROUND AND SUMMARY OF THE INVENTION

This application claims the priority of Application No. 103 11 837.3, filed Mar. 18, 2003, in Germany, the disclosure of which is expressly incorporated by reference herein.

The present invention relates to a wind-deflecting device for a convertible with a center part of the wind-deflecting device, which in its upright operating position is arranged between spaced-apart bar sections of a rollover bar and is held in place on the rollover bar via releasable locking connections, wherein each releasable locking connection comprises a receiving means fixed to the rollover bar, which interlocks with a laterally supported holding element of the center part, and the locking connection.

DE 196 32 352 A1 discloses a multipart configuration of a wind-deflecting device for a convertible. A center part of the wind-deflecting device is arranged in its upright operating position between spaced-apart bar sections of a rollover bar and is held in place on the rollover bar by releasable locking connections. Each locking connection comprises a receiving means mounted to the rollover bar, which interlocks with a laterally supported holding segment of the center part. Each locking connection further comprises a pivotable spring-loaded notch lever for releasing the locking connection. In this arrangement, the notch levers are disposed on the rear of the frame of the removable center part of the wind-deflecting device. As a result, it is difficult to release the locking connection from a sitting position within the vehicle. Furthermore, the operator cannot clearly distinguish in which direction the notch levers have to be pivoted to release the center part.

An object of the present invention is to further improve a releasable locking connection for a center part of a wind-deflecting device such that the releasable locking connection can be easily released from a sitting position and the control is readily distinguishable.

According to the invention, this object has been attained by providing that the notch lever is arranged on the fixed receiver and that a pushbutton interacting with the notch lever is provided on the receiving means for pivoting the notch lever.

Main advantages afforded by the invention are, among other things, that the arrangement of the notch lever on the fixed receiving means and a pushbutton for pivoting the notch lever enable the locking connection to be released even from a sitting position and that the ease with which the locking connection can be released is significantly enhanced.

All the moving parts of the releasable locking connection are provided on the fixed receiver. The rubber buffer mounted in the receiver ensures rattle-free interlocking between the receiver and the center part and pushes the center part into a removal position after the locking connection has been released. The pushbutton disposed on the topside of the receiver can be easily reached from the front seats, and the actuation direction of the pushbutton to release the locking connection is clearly defined.

BRIEF DESCRIPTION OF THE DRAWINGS

Other objects, advantages and novel features of the present invention will become apparent from the following detailed description of the invention when considered in conjunction with the accompanying drawings, wherein.

DETAILED DESCRIPTION OF THE DRAWINGS

Figure 1:
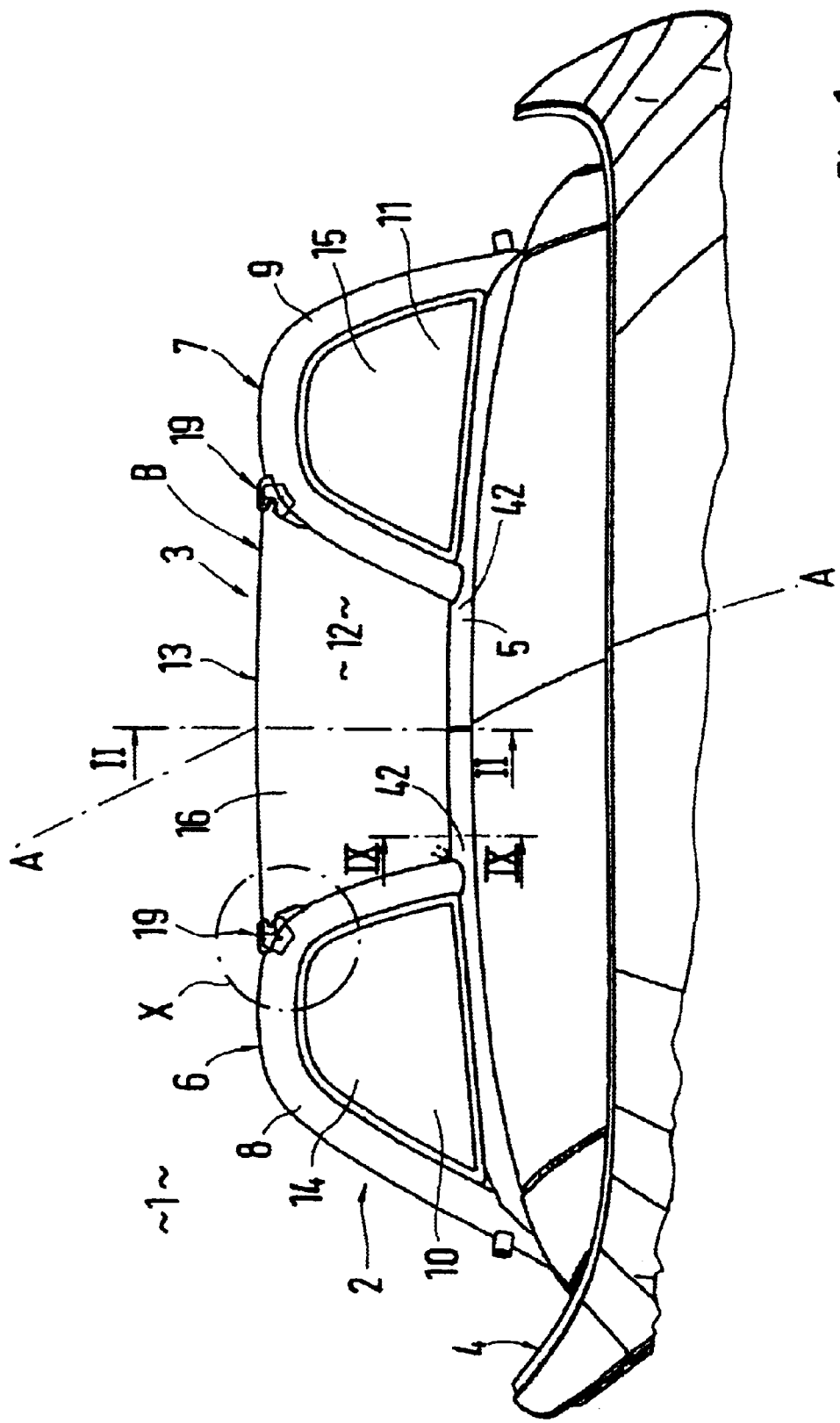
FIG. 1 is a perspective view from the rear of a fixed rollover bar of an open (convertible) motor vehicle with a multipart wind-deflecting device mounted on the rollover bar.

An open two-seater (convertible) automobile, which need not be depicted in detail, has a fixed rollover bar 2 behind the front seats 1. A wind-deflecting device 3 is mounted on the rollover bar 2 to protect the occupants in the front seats 1 from annoying air currents flowing in from behind, i.e., disagreeable drafts affecting the head and neck area.

The rollover bar 2, which is fixed to the vehicle floor by upright support sections, has at least one tube section 5 which extends in transverse vehicle direction approximately at the level of the vehicle safety-belt line 4 and which is slightly curved in the embodiment shown. Two upwardly projecting bar sections 8, 9 extending from the transverse tube section 5 are arranged in the respective lateral external areas 6, 7. Each bar section 8, 9 together with a partial area of the transverse tube section 5 delimits a respective opening 10, 11. The areas of the bar sections 8, 9 facing the central longitudinal vehicle plane A—A and a lower central area of the tube section 5 define a section 12 of the rollover bar 2 which is open toward the top.

The wind-deflecting device 3 extending in a vertical direction is composed of a center part 13 and two side parts 14, 15. The side parts 14, 15 are inserted into the openings 10 and 11 of the bar sections 8 and 9, and the center part 13 is inserted into the section 12 of the rollover bar 2.

The center part 13 is formed by a transparent upright pane 16 which is releasably connected with the rollover bar 2. For weight reasons, this pane 16 is preferably made of a suitable plastic (e.g., polycarbonate). The pane 16 can have a scratch-resistant coating and/or can be tinted. However, the pane 16 can also be made of suitable glass. Along the bottom edge of thee pane 16 and/or along the two lateral exterior upright edges of the pane 16 is provided a frame 17, which is connected to the inserted pane 16 by bonding, clipping, injection-molding, etc.

In the embodiment shown, the frame 17 is formed integrally with the three-dimensional pane 16. The two components can have the same color or can be tinted differently.

The center part 13 of the wind-deflecting device 3 is held in place on the rollover bar 2 when in operating position B via at least one lower insertion connection 18 and two upper spaced-apart locking connections 19.

Figure 2:
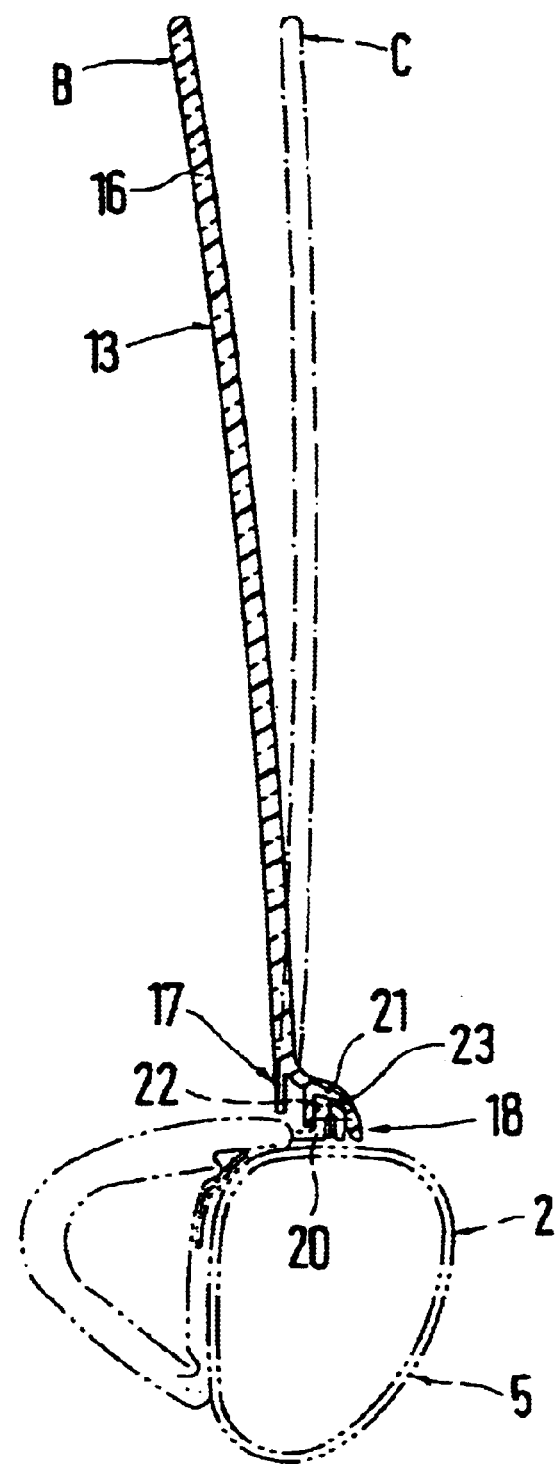
FIG. 2 is an enlarged section taken along line II—II of FIG. 1 of the lower insertion connection between the center part of the wind-deflecting device and the rollover bar.
Figure 3:
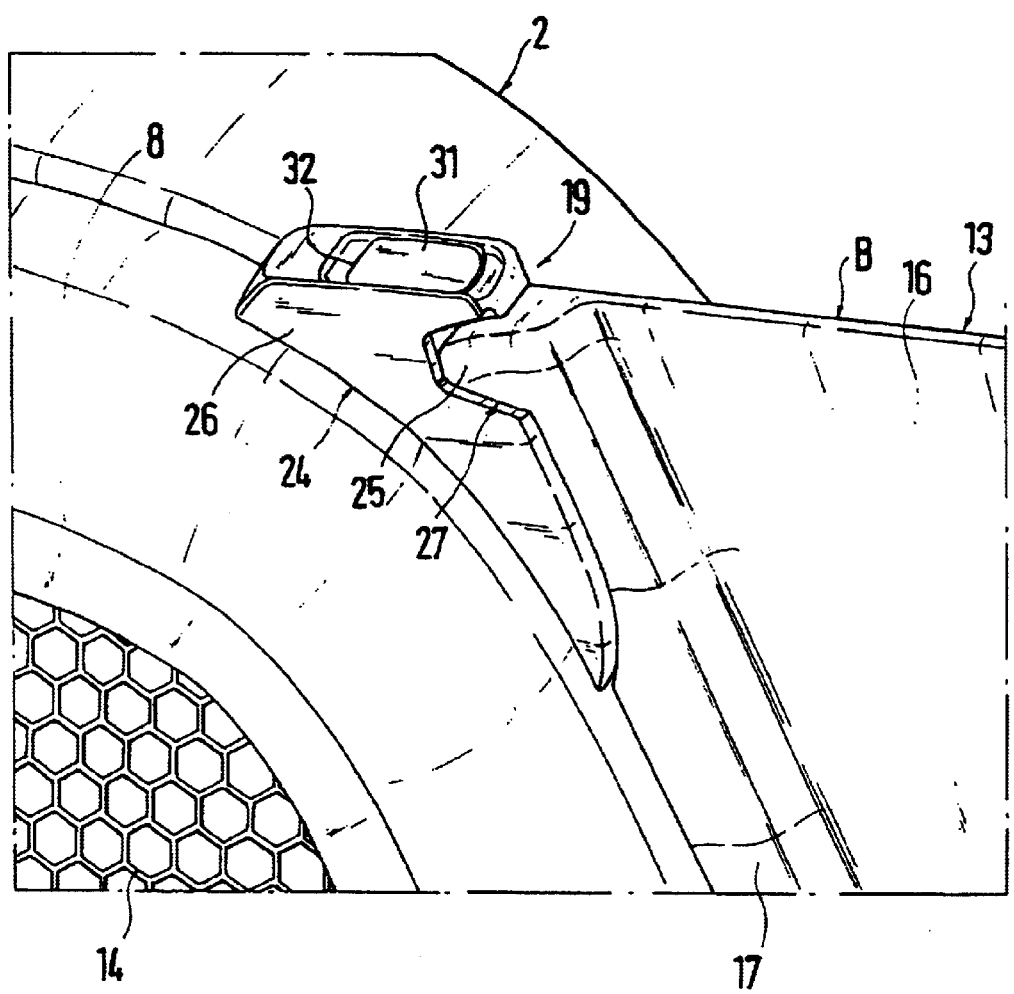
FIG. 3 is a perspective view showing an enlarged detail area designated X of FIG. 1, depicting an upper locking connection between the center part of the wind-deflecting device and the rollover bar.
Figure 4:
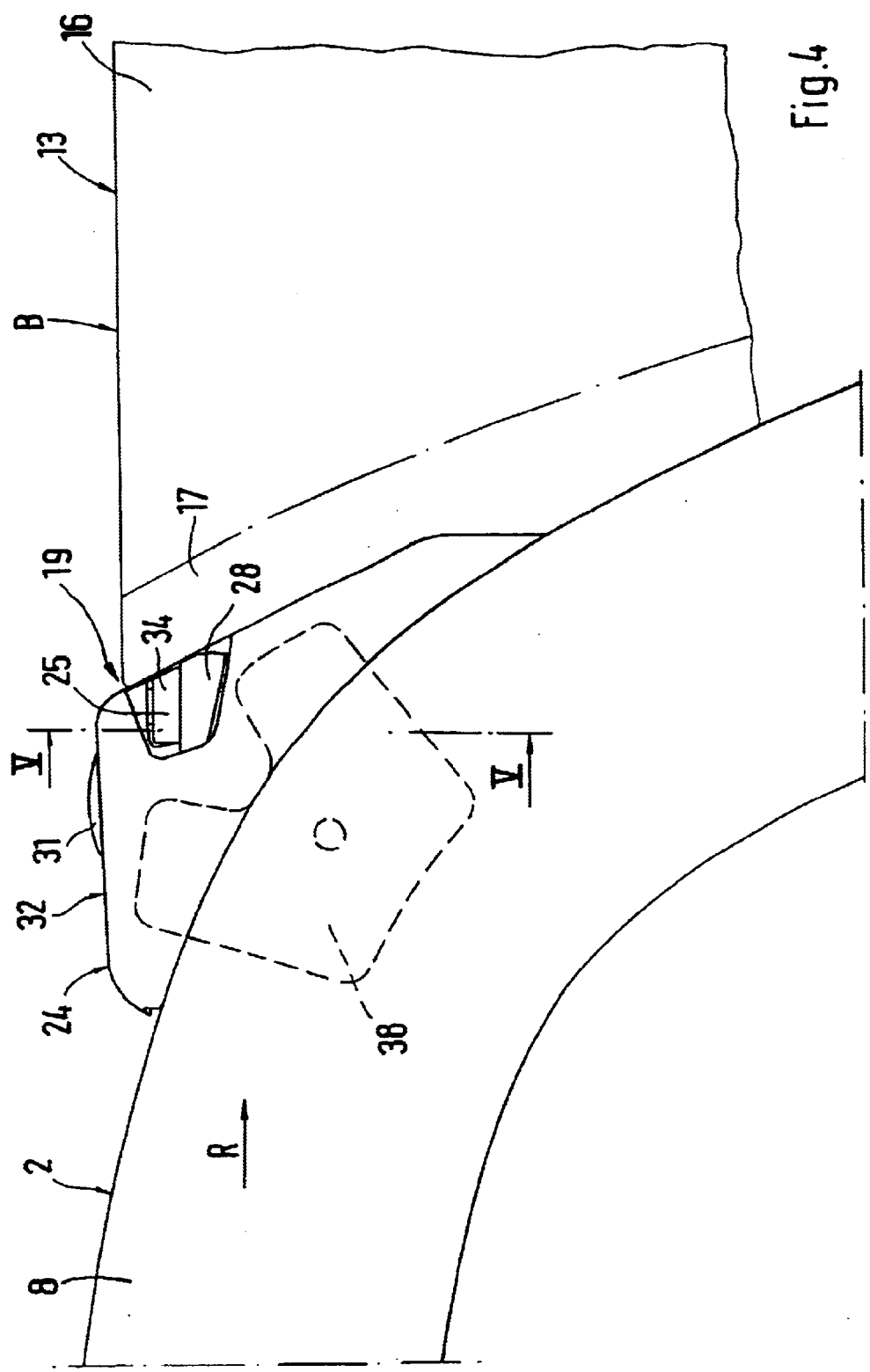
FIG. 4 is a view from the rear of the releasable locking connection arranged between the rollover bar and the center part of the wind-deflecting device.

The lower insertion connection 18, which in the exemplary embodiment is provided approximately in the area of a central longitudinal vehicle plane A-A, comprises a bearing element 20 and a seat 21 interacting therewith (FIG. 2). The bearing element 20 extends above the transverse tube section 5 of the rollover bar 2 and is fixed to the padding of the rollover bar 2. According to FIG. 2, the bearing element 20 has an approximately semi-circular upwardly protruding bearing section 22 which extends in a transverse vehicle direction and is in operative engagement with the corresponding trough-shaped recess 23 of the frame 17 when the center part 13 of the wind-deflecting device is mounted. The bearing section 22 and the recess 23 are formed in such a way as to enable a limited pivoting motion of the center part 13 (e.g., approximately 15°±5°) during mounting.

To mount the center part 13 with the recess 23 in the exemplary embodiment shown, it is placed from the top or at an angle from the back onto the protruding bearing section 22 (removal or insertion position C). Once the lower insertion connection 18 (preliminary fixation) has been established, the center part 13 is pivoted forward about the lower bearing element 20 until the center part 13 automatically snaps into the upper locking connection 19 (operating position B). FIG. 2 shows the operating position B with solid lines and the removal or insertion position C with dash-dotted lines.

Figure 7:
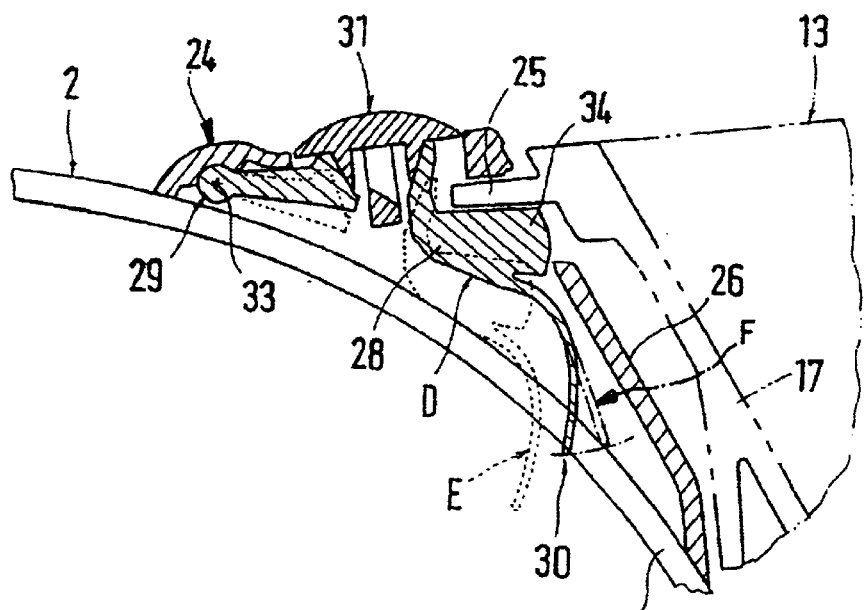
FIG. 7 is a section taken along line VII—VII of FIG. 6 showing the notch lever in its as-manufactured state and in the installed state in which the free end of the notch lever is moved into its installed position on the top side of the rollover bar.
Figure 8:
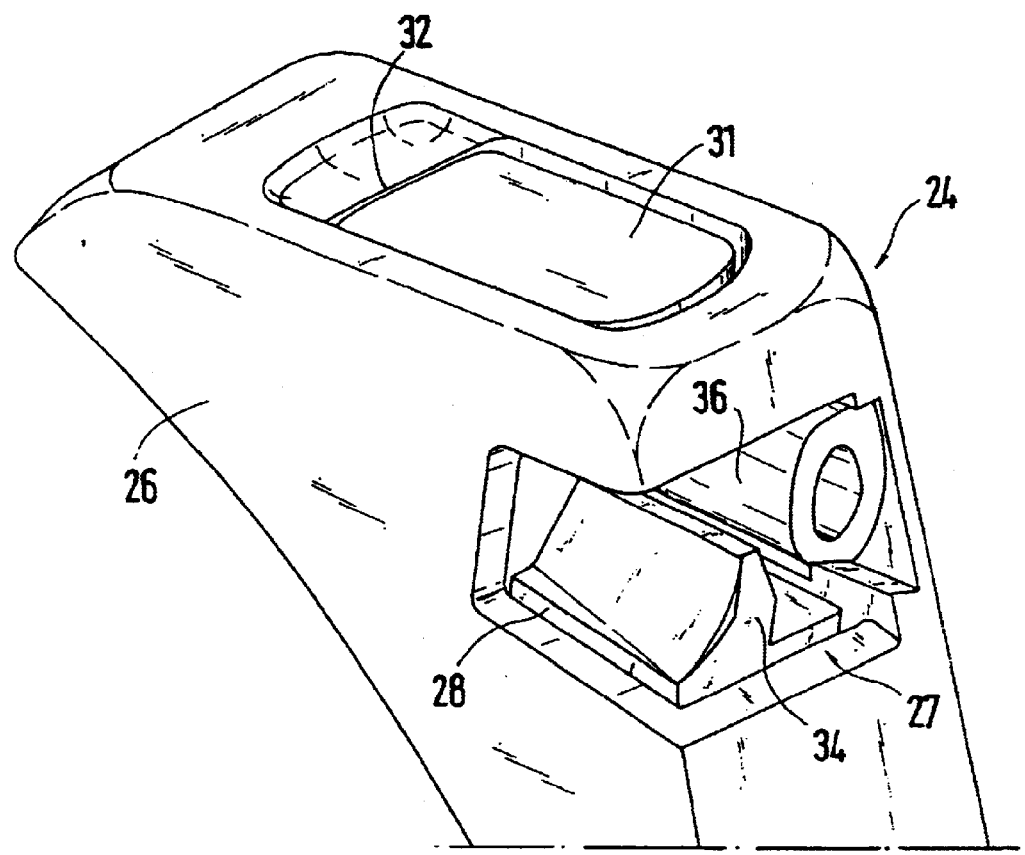
FIG. 8 is a perspective view of the fixed receiver of the releasable locking connection diagonally from the rear.

Each locking connection 19 comprises a receiving device or mechanism 24 fixed to the adjacent bar section 8 and 9 of the rollover bar 2. When the center part 13 is mounted, the receiving device 24 is in operative engagement with a cam-shaped holding element 25 formed onto the center part 13. The receiving mechanism 24 comprises a hollow housing 26 which is open toward the bottom and has an insertion opening 27 for the laterally protruding cam-shaped holding element 25 of the center part 13. Extending within the housing 26 is a spring-loaded notch lever 28 which, at its one end 29, is rotatably supported on the housing 26 and with its opposite leaf spring-shaped end 30 rests in the installed state F (dot dashed lines) under initial tension against the outside of the bar section 8 or 9 of the rollover bar 2 (FIGS. 5 and 7) from an as-manufactured state E (dotted lines) in which the end 30 extends below the roller bar.

The notch lever 28 can be displaced in downward direction by way of a pushbutton 31 from a locked position D to a release position E. Once the pushbutton 31 has been released, it is pushed back in an upward direction together with the notch lever 28 by the leaf-spring end 30 of the notch lever 28.

In the shown embodiment, a recess 32 is made in the topside of the housing 26 to receive the pushbutton 31. When the center part 13 is locked, the pushbutton 31 slightly protrudes over the upper contour of the receiver 24. The pushbutton 31 extends adjacent to the rotation axis 33, which axis extends in longitudinal vehicle direction, of the notch lever 28. The pushbutton 31 can be formed by a separate component that is clipped onto or similarly connected with the notch lever 28. According to FIG. 7, the pushbutton 31 rests locally on the topside of the notch lever 28 and is held in place on the notch lever 28 by a known type of clip-on connection (not shown). A bar of the pushbutton 31 that extends in downward direction is guided through a crater-like opening of the notch lever 28 and with an end-side hook section rests against the underside of a wall of the notch lever 28 (not shown).

Figure 5:
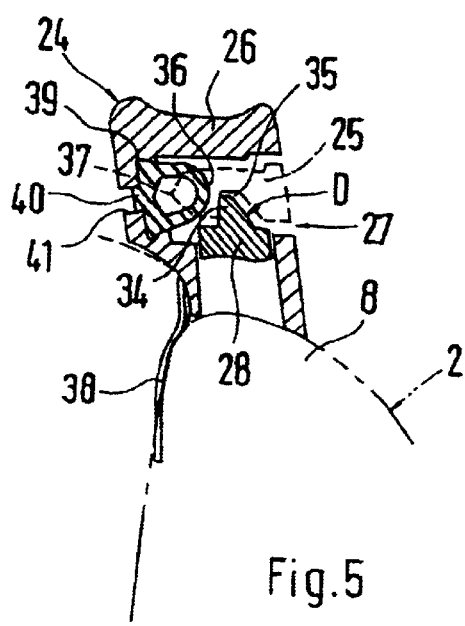
FIG. 5 is a section taken along line V—V of FIG. 4.
Figure 6:
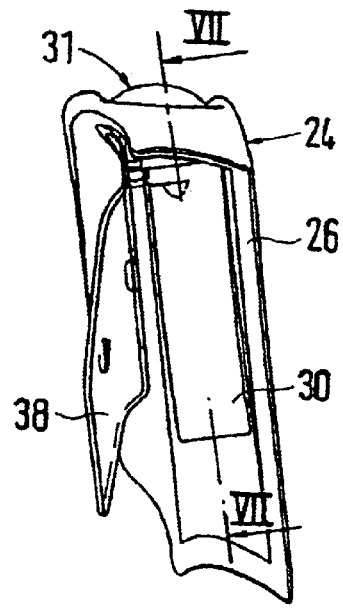
FIG. 6 is a view in the direction of arrow R of FIG. 4.

The pushbutton 31 could also, however, be integral with the notch lever 28. In the area of the insertion opening 27, a transversely extending, upwardly protruding locking projection 34 is formed on the notch lever 28 and engages with a receiving groove 35 of the cam-shaped holding element 25 when the center part 13 is mounted (FIG. 5). On the side of the housing 26 opposite the insertion opening 27, an elastic rubber buffer 36 is provided in the area of the insertion opening 27 which is under initial tension and interacts with the edge area 37 of the cam-shaped holding element 25 of the center part 13. The tube-shaped, compressed rubber buffer 36 prevents rattling noises when the center part 13 is inserted and further ensures that the cam-shaped holding element 25 is moved slightly out of the insertion opening 27 when the notch lever 28 is unlocked (spring action). The receiving mechanism 24 is fixed (e.g., riveted) to the rollover bar 2 via a rivet bracket 38.

To release the locking connection 19, it is sufficient to press the pushbutton 31 down slightly, which causes the locking projection 34 of the pivotably supported notch lever 28 to disengage from the receiving groove 35 of the cam-shaped holding element of the center part 13. At the same time, the rubber buffer 36 moves the cam-shaped holding segment to the removal position C. The rubber buffer 36 is held in a dovetail-shaped guide 39 of the housing 26 and has a circular projection 40 that protrudes into an opening 41 of the housing 26 (FIG. 5).

Figure 9:
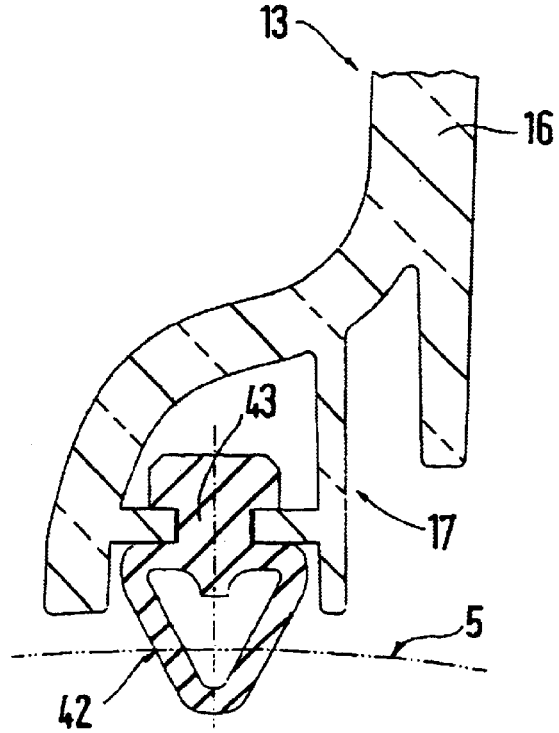
FIG. 9 is an enlarged section taken along line IX—IX of FIG. 1.

For a rattle-free connection of the center part 13 on the rollover bar 2, elastic support elements 42 that locally project in downward direction are arranged on the underside of the frame 17. These support elements rest under initial tension against the topside of the transverse tube section 5 (FIG. 9). The oblong rubber support elements 42 are inserted from the side into undercut receiving sections 43 of the frame 17. In the exemplary embodiment shown, two spaced-apart hollow support elements 42 are provided on the underside of the center part 13.

The foregoing description and examples have been set forth merely to illustrate the invention and are not intended to be limiting. Since modifications of the described embodiments incorporating the spirit and substance of the invention may occur to persons skilled in the art, the invention should be construed broadly to include all variations within the scope of the appended claims and equivalents thereof.

What is claimed is:

1. A wind-deflecting device having a central portion arranged in an upright operating position thereof between spaced-apart bar sections of a vehicle rollover bar and being held in place on the rollover bar via releasable locking connections, each of the releasable locking connections comprising a receiver operatively fixed to the rollover bar and interlockable with a laterally supported holding element of the central portion, and a pivotably supported spring-loaded notch lever operable to release the locking connections, wherein the notch lever is arranged on the receiver, and a pushbutton interacting with the notch lever is provided on the receiver for pivoting the notch lever.

2. The wind-deflecting device as claimed in claim 1, wherein the pushbutton is arranged on a top side of the receiver.

3. The wind-deflecting device as claimed in claim 1, wherein the notch lever is arranged within a hollow housing of the receiver.

4. The wind-deflecting device as claimed in claim 3, wherein an upper end of the notch lever is supported on the housing so as to be pivotable about a rotation axis extending in a longitudinal vehicle direction, and an opposite leaf spring-shaped end of the notch lever rests under initial tension against an outside portion of the bar section.

5. The wind-deflecting device as claimed in claim 4, wherein the pushbutton engages the notch lever at a distance from the rotation axis.

6. The wind-deflecting device as claimed in claim 1, wherein the pushbutton is configured as a separate component that is clippable to or connected with the notch lever.

7. The wind-deflecting device as claimed in claim 1, wherein the pushbutton is integral with the notch lever.

8. The wind-deflecting device as claimed in claim 1, wherein, in an area of an insertion opening made in the receiver, a locking projection extending in a transverse vehicle direction is formed on the notch lever is engageable with a receiving groove on the holding element when the central portion is mounted.

9. The wind-deflecting device as claimed in claim 8, wherein, on an inside of the housing in the area of an insertion opening, an elastic rubber buffer is arranged to interact with an edge area of the cam-shaped holding element.

10. The wind-deflecting device as claimed in claim 1, wherein the central portion comprises a three-dimensional pane and a plastic frame integrally connected with the pane, wherein the holding elements comprise cam-shaped holding elements locally formed onto the frame.

* * * * *